(12) United States Patent
Yantovsky

(10) Patent No.: US 6,477,841 B1
(45) Date of Patent: Nov. 12, 2002

(54) CLOSED CYCLE POWER PLANT

(75) Inventor: Evgeny Yantovsky, Aachen (DE)

(73) Assignee: Solmecs (Israel) Ltd., Omer (IL)

(*) Notice: Subject to any disclaimer, the term of this patent is extended or adjusted under 35 U.S.C. 154(b) by 0 days.

(21) Appl. No.: 09/937,152

(22) PCT Filed: Mar. 14, 2000

(86) PCT No.: PCT/IL00/00154
§ 371 (c)(1),
(2), (4) Date: Jan. 15, 2002

(87) PCT Pub. No.: WO00/57105
PCT Pub. Date: Sep. 28, 2000

(30) Foreign Application Priority Data

Mar. 22, 1999 (IL) ................................. 129101

(51) Int. Cl.[7] .............................................. B60K 16/00
(52) U.S. Cl. ........................... 60/641.8; 60/651; 60/671
(58) Field of Search ...................... 60/641.8, 641.11, 60/641.15, 651, 671

(56) References Cited

U.S. PATENT DOCUMENTS

| | | | |
|---|---|---|---|
| 4,209,943 A | * | 7/1980 | Moeller et al. ............ 47/1.4 |
| 4,311,014 A | * | 1/1982 | Terry et al. ................ 60/649 |
| 4,333,263 A | * | 6/1982 | Adey ......................... 47/1.4 |
| 4,334,026 A | | 6/1982 | Chynoweth et al. |
| 4,377,071 A | * | 3/1983 | Assaf et al. .............. 60/641.8 |

FOREIGN PATENT DOCUMENTS

| | | |
|---|---|---|
| GB | 2 254 858 | 10/1992 |
| WO | WO 95/24548 | 9/1995 |

OTHER PUBLICATIONS

Patent Abstracts of Japan vol. 015, No. 385 (C–0871), Sep. 27, 1991 & JP 03 154616 A (Mitsubishi Heavy Ind Ltd), Jul. 2, 1991 Abstract.

* cited by examiner

Primary Examiner—Hoang Nguyen
(74) Attorney, Agent, or Firm—Morgan, Lewis & Bockius LLP

(57) ABSTRACT

The invention provides a method for the conversion of solar energy stored by photosynthesis to electrical energy, utilizing a closed cycle power plant (2) comprising providing a body of water (4) for growing macroalgae (6) therein, and providing a fluidized bed combustion chamber (8) for at least partial combustion of partially dried macroalgae having a water content of up to 60% wt/wt, the combustion being carried out in an artificial atmosphere of oxygen and carbon dioxide.

17 Claims, 2 Drawing Sheets

US 6,477,841 B1

CLOSED CYCLE POWER PLANT

Figure 1:
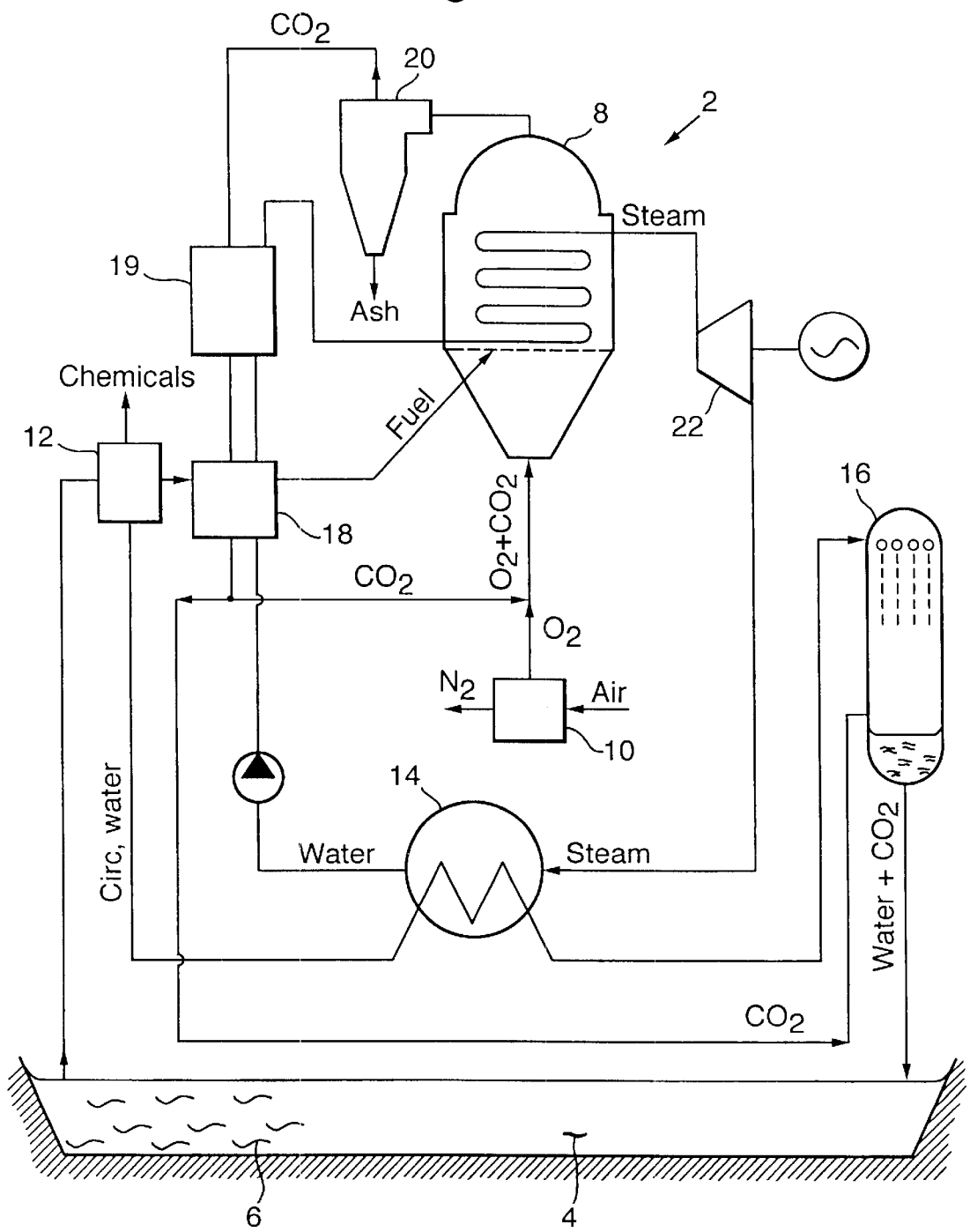

This application is the National Phase of International Application PCT/IL00/00154 filed Mar. 14, 2000 which designated the U.S. and that International Application was published under PCT Article 21(2) in English.

TECHNICAL FIELD

The present invention is directed to a method for the conversion of solar energy stored by photosynthesis to electrical energy. More particularly, the present invention is directed to a method for the conversion of solar energy stored by photosynthesis to electrical utilizing a closed cycle power plant said method being based on the combustion of macroalgae with zero $CO_2$, emission.

BACKGROUND ART

Many methods for tapping solar energy to produce power are known and used. The most popular are photovoltaics and solar thermals with optical concentration of solar light by means of parabolic troughs or dishes.

Due to a relatively low annular average of energy current density (solar irradiation), which in Central Europe is about 125 W/m$^2$, Israel 250 W/m$^2$ and in the Sahara Desert about 290 W/m$^2$, there is disadvantage in constructing a power plant utilizing the methods mentioned above. For example, the energy required for construction in cases of photovoltaics, having large surfaces covered by pure silicon, big troughs and heliostats as solar receivers is large with regard to the fuel requirements in the manufacturing and construction process. Such expenditure of energy can only be "regained" by the system after several years of use.

The book entitled "Energy and Energy Currents" by the present inventor, E. I, Iantovski, and published by Nova Science Publishers (1894), discloses the combustion of microalgae. However, the use of microalgae was deemed to fail, since it is detrimental to the turbines used within such a power plant.

In contradistinction to the teachings in said book, the present inventors have now found a way to convert solar energy into electrical energy in an efficient, high energy return process by utilizing a process including the combustion of macroalgae.

It is to be noted that the macroalgae (seaweed), as used in the present invention, is of significantly greater size than microalgae, and would be impossible for utilization in a power plant utilizing the microalgae mentioned above. Therefore, the present invention is also directed to a novel, method utilizing the same, which differs from the system described in said book, not only in the use of microalgae as opposed to microalgae, as taught and suggested therein, but also in the use of a different combustion system.

SUMMARY OF INVENTION

Thus, according to the present invention there is now provided a method for the conversion of solar energy stored by photosynthesis to electrical energy utilizing a closed cycle power plant comprising:
 a) providing a body of water and introducing microalgae for growth therein; and
 b) providing a fluidized bed combustion chamber for at least partial combustion of partially dried microalgae having a water content of up to 60% wt/wt, said combustion being carried out in an artificial atmosphere of oxygen and carbon dioxide.

In preferred embodiments of the present invention said microalgae have an average size of at least 5 micron; said atmosphere is substantially devoid of nitrogen; said combustion is carried out at a temperature of at least about 800° C.; and said combustion is carried out at a pressure of at least about atmospheric pressure, wherein ash from said combustion is recycled to said body of water to serve as nutrients for the growth of said microalgae.

In further preferred embodiments said artificial atmosphere is substantially devoid of nitrogen and produced by an air separation unit which removes nitrogen therefrom.

The present invention preferably also provides a method, wherein carbon dioxide produced from said combustion is recycled to said body of water for facilitating photosynthesis.

In preferred embodiments water is separated from said macroalgae before the combustion thereof, said water is utilized for carbon dioxide absorption and further directed to said body of water, and water is used to cool a steam condenser.

In further preferred embodiments the microalgae is selected from the group consisting of Gracillaria and Ulva.

In an even further preferred embodiment the gases produced from said combustion are used for heating steam within a Rankine steam power unit. In addition; gases produced from said combustion are used for vaporizing water within said fluidized bed.

In patent abstracts of Japan volume 015 no. 385 (C-0871) there is disclosed a closed cycle power plant for the conversion of solar energy stored by photosynthesis to electrical energy comprising a body of water for growing algae therein and a combustion chamber for at least partial combustion of dried algae, however, said publication does not teach or suggest the use of microalgae as opposed to the use of microalgae, does not teach or suggest the use of fluidized bed combustion chamber, does not teach or suggest the combustion of dried microalgae having a water content of up to 60% wt/wt and does not teach or suggest the carrying out of the combustion in an artificial atmosphere of oxygen and carbon dioxide.

As can be seen from the description hereinafter microalgae is easy to cultivate and burn in an efficient fluidized bed combustor in contrast to microalgae which is impossible to burn in a fluidized due to its small particle size and low fluidization gas velocity. Furthermore, the relatively high water content of up to 60% is possible in the method of the present invention which utilizes an artificial atmosphere of oxygen and carbon dioxide since there is no ballast in the system such as nitrogen in the presence of which drying of algae would utilize too much energy decreasing efficiency. In addition, the lack of nitrogen in the exhaust gas provides the ability to absorb the total flow of $CO_2$ resulting in a zero emission process which does not require a chimney or stack since all the oxygen is used for vaporizing water within said fluidized bed and all of the carbon dioxide is absorbed in the photosynthesis process.

In another aspect of the invention, said combustion chamber is a fluidized bed-type gasifier and said microalgae undergoes partial combustion and gasification in said fluidized bed gasifier and gasification products from said fluidized bed gasifier are used to power a piston engine or a gas turbine.

The principal aim of the present invention is a power plant having a unique solar energy receiver. This receiver will be in the form of a pond for growing seaweed.

The conversion of the solar radiation is realized through the photosynthesis reaction. This reaction uses the solar energy to convert carbon dioxide and water into organic matter and oxygen:

$$CO_2 + H_2O + h\nu \rightarrow CH_2O + O_2$$

The carbon dioxide from the combustion reaction is first diluted in the water and then sent to the pond to feed the algae. The lower heating value of this organic matter, which is mainly formaldehyde, is around 19 yMj/kg. This value is high enough for combustion. The main problem is that the organic matter must be strongly diluted in water in order to grow, for instance having an organic matter:fluid ratio of 1:1000. This means that the combustible organic matter must be extracted from the pond and at least partially separated from the fluid. A fuel separation unit (FSU) can be used for this purpose.

As mentioned above a preferred seaweed according to the present invention is a Gracillaria seaweed. This seaweed, which is also grown in northern Israel, can achieve an average growth rate of about 8 kg/m²/year.

The Ulva seaweed is a further preferable option and may reach a higher growth rate than the Gracillaria seaweed.

As will be realized, a major advantage of the power plant of the present invention is that it produced energy without pollution, in that there is no $CO_2$ emission to worsen the global greenhouse effect.

The energy current density in the pipe from the algae pond to the power plant, which is about a 100 times more than that obtained by optical concentration is calculated according to the equation:

$$\text{convection} = (a)(s)(V)(LHV) = 19\,000 \text{ kW/m}^2$$

wherein:
a is the concentration factor and is equal to $10^{-3}$ kg of fuel/kg of water;
s is the specific mass of the water and is equal to $10^{-3}$ kg/m³;
V is the mean velocity in the pipe and is equal to 1 m/s;
LHV is the lower heating value of the fuel and is equal to 10 MJ/kg.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 2:
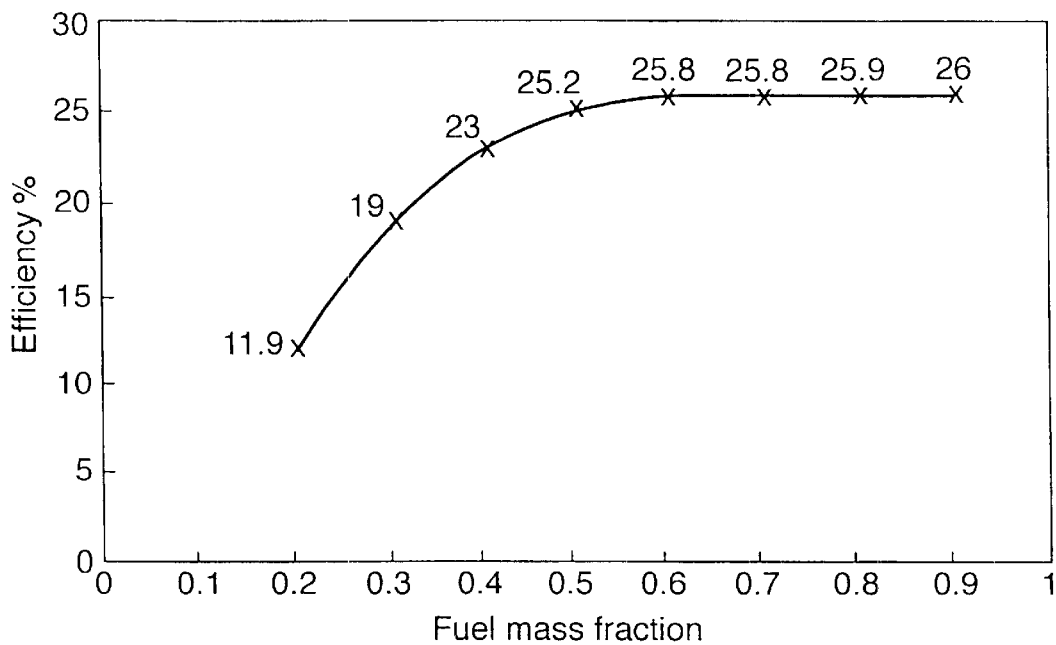
Figure 3:
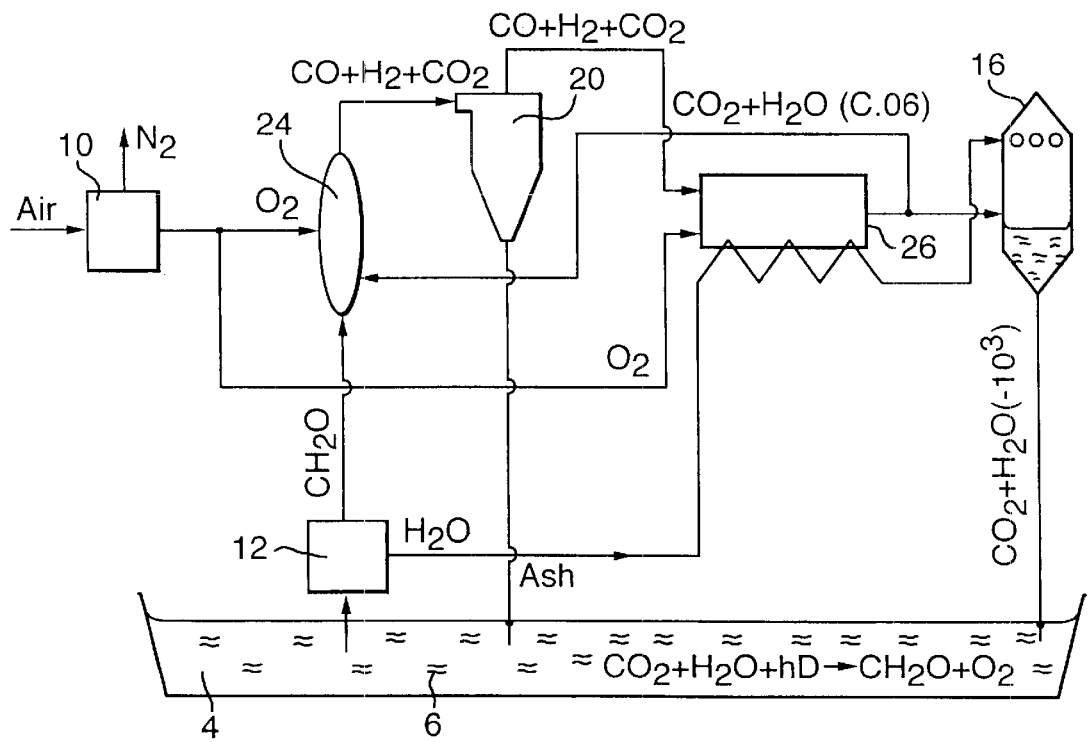

In the drawings:
FIG. 1 is a schematic view of the power plant of the present invention;
FIG. 2 is a graphical representation of the influence of fuel mass fraction on the efficiency of combustion;
FIG. 3 is a schematic view of the power plant, wherein the microalgae undergoes partial combustion and gasification in a fluidized bed gasifier.

Cycle is computer simulated with the ASPen+ commercial code. By attainable photosynthesis efficiency of 6% (Watanabe, de la Nouc and Hall, 1995; Watanabe and Hal, 1995), cycle efficiency of 25–45%, the global one equals 1.5–2.7%. For a 100 kW power unit by an average mid-European solar radiation of 125 W/m², the pond surface would be 3–5 hectares. In southern USA, Australia and Israel with 250 W/m² it would be half.

DETAILED DESCRIPTION OF THE DRAWINGS

In FIG. 1 there is shown a closed cycle power plant (2) for the conversion of solar energy stored by photosynthesis to electrical energy. The plant primarily consists of a body of water (4) for growing microalgae (6) therein and a fluidized bed combustion chamber (8) for combustion of partially dried microalgae having a water content of up to 60% wt/wt, the combustion being carried out in an artificial atmosphere of oxygen and carbon dioxide.

The process is based on a classical Rankine cycle where the biomass fuel is burned in a low pressure fluidized bed boiler. Here, a mixture of oxygen and carbon dioxide is used in the combustion instead of air. The pure oxygen is produced by an air separation unit ASU (10) based on the cryogenic process. The ASU produces $O_2$ with a purity higher than 98% with a specific consumption of 0.22 KWh per keg $O_2$. The main reason for using the above artificial atmosphere is to avoid the presence of nitrogen in the cycle because it prevents the dilution of the carbon dioxide in the water.

The mixture of water and seaweed is pumped out of the pond (4) at 2 bar and is directed to the fuel separation unit (FSU) (12). Up to 99.9% of the water is deflected towards the condenser (14), then the $CO_2$ absorber (16), and the remaining slurry is directed to the fluidized bed boiler (8), via the fuel preheater (18). Water heating regenerator (19) has the same function as a feed water preheater for preheating water entering a boiler and functions to increase efficiency due to the use of the heat of the flue gases and consequently increases the temperature of the heat absorption of the boiler similar to an ordinary Rankine cycle.

The ash is separated in the cyclone (20). A fraction of the exhaust gases is recirculated into the boiler (8) in order to control the combustion temperature of $CH_2O$ in pure $O_2$. The combustion gases are used inside fluidized bed (8) to vaporize the water and superheat the steam up to 540° C. In the Rankine cycle the superheated steam is sent to the stream turbine (22) where it is expected to the condenser (14) pressure, namely 50 mbar. A feed-pump (not shown) pumps the water up to 130 bar.

In order to improve the profitability of power plants, the separation of some highly organized organic matter from the seaweed for the production of chemicals (medicine, food, fodder) can be carried out by the fuel separation unit (12).

FIG. 2 is a graphical representation of the relationship between the amount of fuel mass fraction and the efficiency of combustion. As can be seen, when the microalgae has a ~20% wt/wt presence in comparison to the fluid its efficiency of combustion is ~12%. However, when the presence of microalgae is at least 50% wt/wt, the combustion efficiency stabilized at around 25%. This data eliminates the need for substantially drying the organic matter before combustion.

In FIG. 3, the microalgae (6) is passed through fuel separation unit (FSU) (12) and into gasifier (24) for partial combustion to produce combustible gases $CO+H_2$, together with some ballast $CO_2$. The gasification products are used to power piston gas engine (26). As in the power plant illustrated in FIG. 1, the air separation unit (10) provides the combustion reaction with pure oxygen. The cyclone (20) separates the ash produced in the combustion reaction and directs the ash into pond (4) for enriching the nutrient content thereof. Carbon dioxide produced within the power plant is recycled into the combustion reaction. Excess amounts of carbon dioxide are directed to absorber (16), wherein the $CO_2$ is absorbed by water and the water is then returned to the pond (4) in order to provide $CO_2$ for the photosynthesis process.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for the conversion of solar energy stored by photosynthesis to electrical energy utilizing a closed cycle power plant comprising:
    a) providing a body of water and introducing microalgae for growth therein; and
    b) providing a fluidized bed combustion chamber for at least partial combustion of partially dried microalgae having a water content of up to 60% wt/wt, said combustion being carried out in an artificial atmosphere of oxygen and carbon dioxide.

2. A method according to claim 1, wherein said microalgae have an average size of at least 5 micron.

3. A method according to claim 1, wherein said atmosphere is substantially devoid of nitrogen.

4. A method according to claim 1, wherein said combustion is carried out at a temperature of at least 800° C.

5. A method according to claim 1, wherein said combustion is carried out at a pressure of at least atmospheric pressure.

6. A method according to claim 1, wherein ash from said combustion is recycled to said body of water to serve as nutrients for the growth of said microalgae.

7. A method according to claim 1, wherein said body of water comprises saline.

8. A method according to claim 1, wherein carbon dioxide produced from said combustion is recycled to said body of water for facilitating photosynthesis.

9. A method according to claim 1, wherein water is separated from said microalgae before the combustion thereof and wherein said water is utilized for carbon dioxide absorption and further directed to said body of water.

10. A method according to claim 9, wherein said water is used to cool a steam condenser.

11. A method according to claim 1, wherein said artificial atmosphere is produced by an air separation unit which removes nitrogen therefrom.

12. A method according to claim 1, wherein said microalgae is selected from the group consisting of Gracillaria and Ulva.

13. A method according to claim 1, wherein gases produced from said combustion are used for heating steam within a Rankine steam power unit.

14. A method according to claim 1, wherein gases produced from said combustion are used for vaporizing water within said fluidized bed.

15. A method according to claim 1, wherein said combustion chamber is a fluidized bed-type gasifier and said microalgae partial combustion and gasification in said fluidized bed gasifier.

16. A method according to claim 15, wherein gasification products from said gasifier are used to power a piston engine or a gas turbine.

17. A method according to claim 1, wherein said water is waste or contaminated water.

* * * * *